(12) United States Patent
Bryant et al.

(10) Patent No.: US 6,881,780 B2
(45) Date of Patent: Apr. 19, 2005

(54) DISPERSANT-VISCOSITY IMPROVERS FOR LUBRICATING OIL COMPOSITIONS

(75) Inventors: Charles P. Bryant, Euclid, OH (US); Bryan A. Grisso, Wickliffe, OH (US); Robert Cantiani, Puteaux (FR)

(73) Assignee: The Lubrizol Corporation, Wickliffe, OH (US)

( * ) Notice: Subject to any disclaimer, the term of this patent is extended or adjusted under 35 U.S.C. 154(b) by 449 days.

(21) Appl. No.: 09/924,033

(22) Filed: Aug. 7, 2001

(65) Prior Publication Data

US 2002/0032293 A1 Mar. 14, 2002

Related U.S. Application Data

(62) Division of application No. 09/312,594, filed on May 14, 1999, now Pat. No. 6,294,628, which is a division of application No. 08/492,276, filed on Jun. 19, 1995, now Pat. No. 5,969,068.

(51) Int. Cl.$^7$ .............................................. C08L 39/00
(52) U.S. Cl. ...................................... 524/555; 524/556
(58) Field of Search ................................. 524/555, 556

(56) References Cited

U.S. PATENT DOCUMENTS

| | | | |
|---|---|---|---|
| 3,251,906 A | 5/1966 | Bauer ......................... 260/881 |
| 3,252,949 A | 5/1966 | Fields et al. ............... 260/80.5 |
| 3,506,574 A | 4/1970 | Stambaugh et al. ........ 252/51.5 |
| 3,732,334 A | 5/1973 | Koch et al. .................. 260/875 |
| 3,892,671 A | 7/1975 | Song et al. ............. 252/51.5 A |
| 4,281,081 A | 7/1981 | Jost et al. .................... 525/281 |
| 4,338,418 A | 7/1982 | Jost et al. .................... 525/281 |
| 4,548,990 A | 10/1985 | Mueller et al. .............. 625/123 |
| 4,606,834 A | 8/1986 | Hart et al. ............... 252/51.5 A |
| 4,758,364 A | 7/1988 | Seki et al. ................. 252/56 R |
| 4,822,508 A | 4/1989 | Pennewiss et al. ....... 252/56 R |
| 4,867,894 A | 9/1989 | Pennewiss et al. ........... 252/56 |
| 4,968,444 A | 11/1990 | Knoell et al. ............. 252/56 R |
| 5,043,087 A | 8/1991 | Pennewiss et al. .... 252/51.5 R |
| 5,108,635 A | 4/1992 | Gabillet et al. ........... 252/56 R |
| 5,516,440 A | 5/1996 | Dasai et al. .................. 252/32 |

FOREIGN PATENT DOCUMENTS

| | | |
|---|---|---|
| DE | 1794 257 | 2/1971 |
| DE | 27 26 461 | 12/1977 |
| EP | 0393899 | 4/1990 |
| EP | 0436872 | 7/1991 |
| EP | 0439254 | 7/1991 |
| GB | 1068283 | 5/1967 |
| GB | 1272324 | 2/1971 |

*Primary Examiner*—Bernard Lipman
(74) *Attorney, Agent, or Firm*—Michael F. Esposito; David M. Shold

(57) ABSTRACT

A polyacrylate ester, and more particularly a polymethacrylate ester based dispersant-viscosity improver for lubricating oil compositions. Specifically, the dispersant viscosity improvers of this invention are nitrogen-containing copolymers comprising units derived from (A) from about 5% to about 75% by weight of alkyl acrylate ester monomers containing from 2 to 11 carbon atoms in the alkyl group;

(B) from about 25% to about 95% by weight of alkyl acrylate ester monomers containing from 12 to about 24 carbon atoms in the alkyl group; and (C) From about 0.1% to about 20% by weight of at least one nitrogen containing monomer selected from the group consisting of vinyl substituted nitrogen heterocyclic monomers, N,N-dialkylaminoalkyl acrylate monomers, N,N-dialkylaminoalkyl acrylamide monomers and tertiary-alkyl acrylamides, provided that the total equals 100%. Processes for preparing the compositions, additive concentrates and lubricating oil compositions are described.

26 Claims, No Drawings

DISPERSANT-VISCOSITY IMPROVERS FOR LUBRICATING OIL COMPOSITIONS

This is a divisional of application(s) Ser. No. 09/312,594, filed May 14, 1999, now U.S. Pat. No. 6,294,628, which is a divisional of application Ser. No. 08/492,276 filed Jun. 19, 1995, now U.S. Pat. No. 5,969,068, the disclosures of which are hereby incorporated herein by reference.

FIELD OF THE INVENTION

This invention relates to dispersant-viscosity improvers for lubricating oils, and oil compositions and concentrates containing such dispersant-viscosity improvers.

BACKGROUND OF THE INVENTION

The viscosity of oils of lubricating viscosity is generally dependent upon temperature. As the temperature of the oil is increased, the viscosity usually decreases, and as the temperature is reduced, the viscosity usually increases.

The function of a viscosity improver is to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Viscosity improvers are usually polymeric materials and are often referred to as viscosity index improvers.

Ester group containing polymers are well-known additives for improving the fluidity characteristic of lubricating oils. Polyacrylate, particularly polymethacrylate ester polymers are well-known and are widely used for this purpose.

Dispersants are also well-known in the lubricating art. Dispersants are employed in lubricants to keep impurities, particularly those formed during operation of machinery, in suspension rather than allowing them to deposit on the surfaces of lubricated parts.

Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185–193; C. V. Smalheer and R. K. Smith "Lubricant Additives", Lezius-Hiles Co. (1967); M. W. Ranney, "Lubricant Additives", Noyes Data Corp. (1973), pp 92–145, M. W. Ranney, "Lubricant Additives, Recent Developments", Noyes Data Corp (1978), pp 139–164; and M. W. Ranney, "Synthetic Oils and Additives for Lubricants", Noyes Data Corp. (1980), pp 96–166. Each of these publications is hereby expressly incorporated herein by reference.

Derivatives of polyacrylate esters are well-known as additives for lubricants that provide not only improved viscosity characteristics, but also enhance dispersant properties of lubricants.

It is desirable that the viscosity improver or dispersant viscosity improver not adversely affect the low-temperature viscosity of the lubricant containing same. Frequently, while viscosity improvers or dispersant viscosity improvers enhance the high temperature viscosity characteristics of lubricating oil, that is, they reduce the loss of viscosity with increasing temperature, low temperature properties of the treated lubricant become worse.

One of the major requirements for automatic transmission fluids has been improved low temperature performance as demonstrated by a maximum Brookfield viscosity of 20,000 centipoise at −40° C. The viscosity modifier, which can comprise nearly 50 weight percent of the total additive system employed in an automatic transmission fluid can have a major impact on the low temperature performance. Such characteristics are also desirable in other applications such as in gear lubricants. The copolymers of this invention are also useful in many other lubricating oil compositions including, but not limited to engine oils, hydraulic oils, industrial oils, etc.

Accordingly, it is desirable to provide compositions that reduce the extent of loss of viscosity at high temperatures while not adversely increasing the low temperature viscosity of lubricating oil compositions.

It is a primary object of this invention to provide novel multi-purpose lubricant additives.

A more specific object is to provide multi-purpose additives directed to improving the viscosity and dispersant properties of a lubricating composition.

A further object is to provide processes for preparing such multi-purpose additives.

Still another object is to provide additive concentrates containing the novel multi-purpose lubricant additives of this invention.

Yet another object is to provide lubricants having improved dispersant and viscosity properties.

Other objects will in part be obvious in view of this disclosure and will in part appear hereinafter.

SUMMARY OF THE INVENTION

The present invention is directed to a polyacrylate ester, and more particularly a polymethacrylate ester based dispersant-viscosity improver for lubricating oil compositions. Specifically, the dispersant viscosity improvers of this invention are nitrogen-containing copolymers comprising units derived from (A) about 5% to about 75% by weight of alkyl acrylate ester monomers containing from 1 to 11 carbon atoms in the alkyl group;

(B) about 25% to about 95% by weight of alkyl acrylate ester monomers containing from 12 to about 24 carbon atoms in the alkyl group; and (C) about 0.1% to about 20% by weight of at least one nitrogen containing monomer selected from the group consisting of vinyl substituted nitrogen heterocyclic monomers, dialkylaminoalkyl acrylate monomers, dialkylaminoalkyl acrylamide monomers and tertiary-alkyl acrylamides, provided that the total equals 100%.

The present invention also relates to additive concentrates and lubricating oil compositions containing the compositions of this invention and processes for preparing the compositions.

As used herein, the terms "acrylate" and "acrylamide" include the alkyl acrylates and alkyl acrylamides, and especially, methacrylates and methacrylamides.

DETAILED DESCRIPTION OF THE PREFERRED EMBODIMENTS

According to the present invention a composition of matter suitable for use as a dispersant-viscosity improver for lubricating oil compositions comprises nitrogen-containing copolymers derived from a mixture of alkyl acrylate ester monomers containing, on one hand, from 1 to 11 carbon atoms in the alkyl group and on the other hand from 12 to about 24 carbon atoms in the alkyl group and at least one nitrogen-containing monomer as described in greater detail hereinbelow.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is they are essentially free of atoms other than carbon and hydrogen.

Throughout the specification and claims the expression oil soluble or dispersible is used. By oil soluble or dispersible is meant that an amount needed to provide the desired level of activity or performance can be incorporated by being dissolved, dispersed or suspended in an oil of lubricating viscosity. Usually, this means that at least about 0.001% by weight of the material can be incorporated in a lubricating oil composition. For a further discussion of the terms oil soluble and dispersible, particularly "stably dispersible", see U.S. Pat. No. 4,320,019 which is expressly incorporated herein by reference for relevant teachings in this regard.

In the context of this invention the term "copolymer" means a polymer derived from two or more different monomers. Thus, a polymer derived from a mixture of, for example, methyl-, butyl-, $C_{9-11}$-, and $C_{12-18}$-acrylates is a copolymer as defined herein. The copolymers of this invention also contain units derived from nitrogen-containing monomers.

The nitrogen-containing copolymers of this invention may be prepared by several different processes. In one embodiment, the nitrogen-containing copolymer is obtained by reacting, together, the acrylate ester monomers and the nitrogen-containing monomer. In another embodiment, the nitrogen-containing monomer is grafted onto a preformed acrylate copolymer backbone.

The nitrogen-containing copolymers of this invention are frequently prepared in an organic diluent. It has been determined that specific amounts and types of diluent present in the nitrogen-containing copolymers of the invention can have a pronounced effect on the low temperature viscosity properties of lubricants containing them.

The Alkyl Acrylate Ester Monomers

As stated hereinabove, the nitrogen-containing copolymer comprises units derived from (A) from about 5% to about 75% by weight, preferably from about 30% to about 60% by weight of alkyl acrylate ester monomers containing from 1 to 11 carbon atoms in the alkyl group and (B) from about 25% to about 95% by weight, preferably from about 40% to about 70% by weight of alkyl acrylate ester monomers containing from 12 to about 24 carbon atoms in the alkyl group. In an especially preferred embodiment, the alkyl acrylate ester monomers comprise alkyl methacrylate esters.

In one particular embodiment, monomer (A) comprises at least 5% by weight of alkyl acrylate esters having from 4 to 11 carbon atoms in the alkyl group. In another embodiment, monomer (A) comprises from about 10% to about 40% by weight alkyl acrylate esters having from 1 to 4 carbon atoms in the alkyl group. In still another embodiment, monomer (A) comprises from about 60% to about 90% by weight of alkyl acrylate esters having from 9 to 11 carbon atoms in the alkyl group.

The acrylate ester monomers can be prepared by conventional methods well-known to those of skill in the art. For example, acrylate ester monomers are most often prepared via the propylene oxidation process, a two stage vapor phase oxidation of propylene to acrylic acid, which is then esterified to the desired ester. Previously, the manufacture of acrylates involved the petrochemistry of materials such as acetylene, acrylonitrile and others.

For methacrylates, processes used often vary, depending on the desired monomer. The acetone cyanohydrin process involves the reaction of acetone with HCN to form acetone cyanohydrin which is then reacted with the desired alcohol to form the ester. Propylene carbonylation and many other processes are also used.

A variety of procedures are described in considerable detail in the section entitled "Acrylic and Methacrylic Ester Polymers" in the Encyclopedia of Polymer Science and Engineering, Vol. 1, pp. 247–251, Wiley-Interscience, New York (1985).

Many alkyl acrylate esters are commercially available. Suppliers include, Rohm and Haas; San Esters Corp, with offices in New York, N.Y,; Mitsubishi Rayon Co. Ltd.; Polysciences, Inc., Warrington, Pa.; Sartomer Co., Exton, Pa.; and others.

The Nitrogen-Containing Monomer

The nitrogen-containing copolymers of this invention also comprise units derived from (C) from about 0. 1% to about 20% by weight, and in one embodiment from about 0.5% to about 5% by weight, especially from about 1.5% to about 2.5% by weight of at least one nitrogen-containing monomer selected from the group consisting of vinyl substituted nitrogen heterocyclic monomers, dialkylaminoalkyl acrylate monomers, dialkylaminoalkyl acrylamide monomers and tertiary-acrylamides.

In one embodiment, the nitrogen-containing monomer is an N-vinyl substituted heterocyclic monomer. Examples of such monomers include N-vinyl imidazole, N-vinyl pyrrolidinone and N-vinyl caprolactam.

In another embodiment, the vinyl substituted heterocyclic monomer is vinyl pyridine.

In yet another embodiment, the nitrogen-containing monomer is a N,N-dialkylaminoalkyl acrylamide or acrylate wherein each alkyl or aminoalkyl group contains, independently, from 1 to about 8 carbon atoms.

In a further embodiment, the nitrogen-containing monomer is a tertiary-alkyl acrylamide, preferably tertiary butyl acrylamide.

The Diluent

As noted hereinabove, the copolymers of this invention may be prepared in the presence of a diluent. A diluent may also be added to a substantially diluent-free copolymer, usually by dissolving or dispersing the substantially diluent-free polymer in an appropriate diluent.

In one embodiment, the diluent is a mineral oil. In an especially preferred embodiment the mineral oil consists essentially of hydrotreated naphthenic oil.

The diluent may also be a synthetic oil. Common synthetic oils are ester type oils, polyolefin oligomers or alkylated benzenes.

The diluent-containing copolymers of this invention are referred to herein as additive concentrates. Such additive concentrates are then added, along with other desirable performance-improving additives, to an oil of lubricating viscosity to prepare the finished lubricant composition.

The additive concentrates preferably comprise from about 25% to about 90% by weight of copolymer, preferably from 35% to about 80% by weight, and from about 10% to about 75% by weight of diluent, preferably from about 20% to about 65% by weight of diluent.

In one embodiment, selection of diluents having particular characteristics leads to enhanced performance of dispersant-viscosity improvers of this invention. For example, lubricating oil compositions comprising additive concentrates containing certain diluents together with the nitrogen-containing polymers of this invention have enhanced low temperature characteristics. Particularly valuable are lubricating oil compositions that display excellent viscosity characteristics at very low temperatures, for example, from −5° C. to −40° C.

The certain diluents that impart surprising and exceptional low temperature performance when used in conjunction with the dispersant viscosity improvers of this invention, have in common very low viscosity at very low temperatures. In particular they all display Brookfield viscosities (expressed in centipoise) at −26° C. ranging from about 50 to about 400, more preferably from about 80 to about 200. At −40° C. useful oils have Brookfield viscosities (expressed in centipoise) ranging from about 100 to about 1500, more preferably from about 125 to about 600. Brookfield viscosities are determined employing ASTM Procedure D-2983 described in greater detail hereinafter. These particularly useful diluents display viscosities (ASTM Procedure D-445) at 40° C. ranging from about 2.5 to about 6 centistokes and at 100° C. ranging from about 1 to about 2.5 centistokes.

Included among such useful diluents are naphthenic oils, hydrotreated naphthenic oils, and alkylated aromatics, particularly alkylated benzenes having at least one alkyl group containing from about 8 to about 24 carbon atoms, preferably from 12 to about 18 carbon atoms. Especially useful are hydrotreated naphthenic oils, examples being Risella G-07, Cross Oil Co.'s L-40, a 40 neutral hydrotreated naphthenic oil and L-60, which is a 60 neutral oil.

Low temperature viscosity (Brookfield Viscosity) of fluid lubricants is determined using ASTM Procedure 2983, Standard Test Method for Low Temperature Viscosity of Automotive Fluid Lubricants Measured by Brookfield Viscometer, which appears in the Annual Book of ASTM Standards, Section 5, ASTM, Philadelphia, Pa., USA. This procedure employs a Brookfield Viscometer which is described in the procedure. The device is available from Brookfield Engineering Laboratories, Stoughton, Mass., USA.

ASTM Procedure D-445 is described hereinafter.

The Nitrogen-Containing Copolymer

The copolymers of this invention have a number average molecular weight ($M_n$) ranging from about 10,000 to about 300,000, more often from about 20,000 to about 150,000 frequently from about 30,000 to about 100,000.

Molecular weights of polymers are determined using well-known methods described in the literature. Examples of procedures for determining molecular weights are gel permeation chromatography (also known as size-exclusion chromatography) and vapor phase osmometry. These and other procedures are described in numerous publication including:

P. J. Flory, "Principles of Polymer Chemistry" Cornell University Press (1953), Chapter VII, pp 266–316, and "Macromolecules, an Introduction to Polymer Science", F. A. Bovey and F. H. Winslow, Editors, Academic Press (1979), pp 296–312.

W. W. Yau, J. J. Kirkland and D. D. Bly, "Modern Size Exclusion Liquid Chromatography", John Wiley and Sons, New York, 1979.

A measurement which is complementary to a polymer's molecular weight is the melt index (ASTM D-1238). Polymers of high melt index generally have low molecular weight, and vice versa. Mooney Viscosity (ASTM Procedure D-1646-87) relates indirectly to polymer molecular weight. All other factors being equal, as molecular weight of the polymer increases, so too does the Mooney viscosity.

ASTM Procedures D-1238 and D-1646-87 appear in Volumes 8 and 9, respectively, of the aforementioned Annual Book of ASTM Standards.

A preferred method, and the method employed to determine the molecular weights of polymers as set forth herein, is gel permeation chromatography (GPC) employing polyacrylate standards.

As noted hereinabove, the copolymers of this invention may be prepared by several different techniques. In one embodiment, the acrylate ester monomers and nitrogen-containing monomer are reacted together. In another embodiment, the acrylate esters are reacted to form an acrylate ester copolymer backbone onto which is grafted a nitrogen-containing monomer. In still another embodiment, a mixture of acrylate and nitrogen-containing monomers may be grafted onto a preformed acrylate ester polymer backbone.

In the first embodiment, a mixture of monomers is charged to a reactor together with, if desired, diluent and again, if desired, chain transfer agent. The materials are stirred under a nitrogen atmosphere. Subsequently, a polymerization initiator is added and the materials are heated to reaction temperature. The reaction is continued until the desired degree of polymerization is attained.

In an alternative, and generally preferred embodiment, the monomers are polymerized incrementally. A mixture of monomers together with a polymerization initiator is prepared. A portion, typically about 20% to about 40%, more often about 33%, of the mixture, is charged to a reactor with the balance being placed in an addition vessel. The reactants are heated under a nitrogen atmosphere until an exothermic reaction is noted. When the exothermic reaction begins to subside, addition of the balance of the monomer-initiator mixture is begun, while maintaining, via heating or cooling, as needed, the desired reaction temperature.

In the second embodiment, the acrylate monomers are polymerized, then the grafting of the nitrogen-containing monomer onto the preformed acrylate ester copolymer is accomplished. A mixture of additional acrylate monomers together with nitrogen-containing monomer may be grafted onto the preformed acrylate ester polymer.

Either the single step procedure or the incremental procedure outlined above may be used for polymerization of the acrylate monomers.

The entire charge of the nitrogen containing monomer may be present at the start of the polymerization process. Alternatively, the nitrogen containing monomer may be added to the already prepared polyacrylate either gradually or incrementally. In the grafting process, additional initiator is usually employed during the grafting step. In either process, additional initiators may be added during processing.

Polymerization can take place under a variety of conditions, among which are bulk polymerization, solution polymerization, emulsion polymerization, suspension polymerization and nonaqueous dispersion techniques.

To prepare the copolymers constituting the dispersant viscosity improvers in accordance with the invention it is possible to make use of the conventional methods of radical copolymerization.

Such methods are described in the work "Encyclopedia of Polymer Science and Engineering" (H. F. Mark, N. M. Bikales, C. G. Overberger and G. Menges), 2nd edition (1988), published by Wiley Interscience.

These methods include free-radical initiated polymerization employing azo compounds or peroxides. Also described therein are photochemical and radiation initiated methods.

Useful initiators include organic peroxides, hydroperoxides and azo compounds.

Molecular weights of the polymers can be controlled employing a number of techniques including choice of initiator, reaction temperature, concentration of monomers and solvent type. Chain transfer agents can also be used.

Ionic polymerization techniques are known including cationic and anionic methods; however, cationic methods are generally ineffective for acrylate and methacrylate monomer polymerization.

Free radical initiation is preferred.

Free radical generating reagents useful as polymerization initiators are well known to those skilled in the art. Numerous examples of free radical initiators are mentioned in the above-referenced texts by Flory and Bovey and Winslow. An extensive listing of free radical initiators appears in J. Brandup and E. H. Immergut, Editors, "Polymer Handbook", 2nd edition, John Wiley and Sons, New York (1975), pp II-1 to II-40. Numerous free radical initiators are available and many are commercially available in large quantities. Included among free radical initiators are t-butyl peroxide, t-butyl hydroperoxide, t-amyl peroxide, cumyl peroxide, dibenzoyl peroxide (Aldrich), t-butyl,m-chloroperbenzoate, azobisvaleronitrile, t-butyl peroctoate and tertiary-butyl perbenzoate, (Trigonox 21 and Trigonox C, respectively, both from AKZO) and 2,2'-azobis (isobutyronitrile), (VAZO-64, DuPont).

Free radical initiators are usually used in amounts ranging from about 0.01% to about 10 percent by weight based on the total weight of reaction mixture. Preferably, the initiators are used at about 0.05% to about 3% by weight, often up to about 1% by weight.

The choice of free radical initiator can be an important consideration. Considerations include the half-life of the initiator at a given temperature, nature of the reactants, reaction temperature, solvent or diluent, and the like.

The products of the present invention are generally prepared at temperatures ranging from about 60° C. to about 140° C., more often from about 80° C. to about 120° C., and preferably from about 90° C. to about 110° C. The half-life of an initiator at a given temperature is an important consideration.

Because acrylic polymerizations are usually accompanied by liberation of considerable heat, care must be taken to avoid uncontrolled reaction. Temperatures can be controlled by using reactors with cooling jackets, controlling rates of addition and use of reaction solvents.

Another useful means for preparing the copolymers of this invention is to employ a high energy mechanical mixing device. These include roll mills, ball mills or extruders. Of these, extruders are preferred since the comonomers can be fed to the feed hopper in any desired fashion. Methods of employing such devices, and especially extruders, are described in a number of patents including Hayashi et al, U.S. Pat. No. 4,670,173 and Sopko et al, U.S. Pat. No. 5,039,433.

The following examples are intended to illustrate several compositions of this invention as well as means for preparing same. Unless indicated otherwise all parts are parts by weight. It is to be understood that these examples are intended to illustrate several compositions and procedures of the invention and are not intended to limit the scope of the invention. Molecular weight values are determined employing gel permeation chromatography (GPC) employing well-characterized polymethacrylate (PMA) calibration standards.

EXAMPLE 1

A container is charged with 35.1 parts methyl methacrylate, 136.5 parts $C_9$-$C_{11}$ methacrylate, 7.8 parts butyl methacrylate, 136.5 parts $C_{12}$-$C_{15}$ methacrylate, 70.2 parts $C_{16}$-$C_{18}$ methacrylate and 130 parts of a hydrotreated naphthenic oil (Risella G 07, Shell Germany) followed by stirring for 0.25 hours. A solution of 1.36 parts of 2,2-azobismethylbutyronitrile (VAZO-67, DuPont) in 2.7 parts toluene is added and stirred 0.1 hour. A reactor equipped with a stirrer, thermocouple reaching into the charged reaction mixture, $N_2$ inlet atop an addition funnel attached to a subsurface tube, and $H_2O$ condenser is charged with about ⅓ of the monomer-initiator solution. The remainder is placed in the addition funnel. With $N_2$ addition at 0.3 standard cubic feet per hour (SCFH) and stirring, the mixture is heated to 100° C. over 0.3 hour, heating is stopped and an exotherm to 131° C. over 0.1 hours is observed. The temperature begins to drop and after 2 minutes, at 131° C. dropwise addition of the remaining solution is begun. Addition time is 2 hours; 0.4 hours after the peak exothermic temperature, the temperature is 110° C. The temperature during addition is maintained at 110° C. The materials are cooled to 90° C. over 0.3 hour followed by addition of 0.25 part t-butyl peroctoate (Trigonox 21, AKZO) followed by addition of 0.98 parts N-vinylimidazole (NVI), both all at once. While maintaining 90° C., three additional increments, each of 0.98 parts NVI, are added at 0.25 hour intervals for a total of 4 additions. The mixture is held at 90° C. for 1.25 hours after the final NVI addition. An additional 0.13 parts Trigonox 21 is added and the materials are held at 90° C. for an additional 1 hour. An additional 80 parts Risella G 07 oil is added, the materials are heated to 150° C. and stripped at 40–50 millimeters (mm) mercury for 1 hour, collecting 3 parts distillate. The residue is filtered employing a diatomaceous earth filter aid at 110° C. The resulting product has $M_n$=58,400 and polydispersity $(M_w/M_n)$=2.90.

EXAMPLE 2

Following essentially the procedure of Example 1, a solution is prepared by mixing 27.5 parts methyl methacrylate, 5.5 parts butyl methacrylate, 105.5 part $C_9$-$C_{11}$, methacrylate, 105.5 parts $C_{12}$-$C_{15}$ methacrylate, 52.5 parts $C_{16}$-$C_{18}$ methacrylate and 80 parts Risella G 07 oil, then mixing in a solution of 1.2 parts VAZO-67 in 2.4 parts toluene. A reactor is charged with about ⅓ of this mixture and the remainder is added to an addition funnel. With stirring and $N_2$ addition at 0.3 SCFH the mixture is heated to 100° C. over 0.3 hours, heating is discontinued and the temperature rises exothermically to 139° C. over 2 minutes. After 2 minutes the temperature begins to drop; dropwise addition of the remaining monomer-initiator mixture is begun. The temperature is at 110° C. 0.3 hours after the peak exotherm. The balance of the mixture is added over 2 hours at 110° C. The materials are cooled to 90° C. and 0.2 part Trigonox 21 is added all at once. To this mixture are added 3.5 parts NVI at a dropwise rate over 1 hour, the materials are heated at 90° C. for 1 hour followed by addition of 0.1 part Trigonox 21. The materials are heated at 90° C. for 2 hours followed by addition of 0.1 parts Trigonox 21 followed by stirring at 90° C. for an additional 1.2 hours. To this mixture are added 81.5 parts Risella G 07 oil, the materials are heated with stirring to 150° C. and stripped to 40–50 mm Hg for 1 hour while 2 parts distillate are collected. The residue is filtered using a diatomaceous earth filter aid. The filtrate has $M_n$=52,800 and polydispersity= 2.75.

EXAMPLE 3

A container is charged with 35.1 parts methyl methacrylate, 7.8 parts butyl methacrylate, 136.5 parts $C_9$-$C_{11}$ methacrylate, 136.5 parts $C_{12}$-$C_{15}$ methacrylate, 70.2 parts $C_{16}$-$C_{18}$ methacrylate, 4.7 part NVI and 130 parts Risella G 07 oil. The materials are stirred for 0.25 hour, then a solution of 1.56 part VAZO-67 in 3.12 parts toluene is added followed by stirring for 0.1 hour. A reactor equipped as described in Example 1 is charged with about ⅓ of this solution; the remainder is placed in the addition funnel. With stirring and $N_2$ addition at 0.3 SCFH, the mixture is heated to 110° C. over 0.3 hour, heating is stopped and the temperature rises exothermically to 135° C. over 2 minutes. The temperature then begins to drop and after 2 minutes is at 133° C. Dropwise addition of the remaining monomer-initiator mixture is begun and is continued for 2 hours. Temperature decreases to 110° C. after 0.3 hours and is held at 110° C. during addition. After addition is completed, the mixture is cooled to 90° C. over 0.3 hour followed by charging 0.25 part Trigonox 21. The materials are stirred at 90° C. for 2 hours, 0.26 part Trigonox 21 is charged and the materials are heated for an additional 2 hours. The materials are diluted with 80 parts additional Risella G 07 oil, heated with stirring to 150° C., 40–50 mm Hg pressure, and stripped at 150° C. for 1 hour, collecting 1 part distillate. The residue is filtered at 110° C. with a diatomaceous earth filter aid.

EXAMPLE 4

A mixture of methacrylate ester monomers as described in Example 2, 80 parts of 150 Neutral mineral oil and 2.3 parts VAZO-67 in 15 parts butanol are combined to form a solution. Subsequent processing is substantially the same as described in Example 2 except the oil is 150 Neutral and the maximum exotherm is 136° C.

EXAMPLE 5

A container is charged with 30.5 parts methyl methacrylate, 117 parts $C_9$-$C_{11}$ methacrylate, 6.1 parts butyl methaqrylate, 117 parts $C_{12}$-$C_{15}$ methacrylate, 58.2 parts $C_{16}$-$C_{18}$ methacrylate and 88.7 parts of a hydrotreated naphthenic oil (Hydrocal 38, Calumet Lubricants, Princeton, La., USA) followed by stirring for 0.25 hours. A solution of 1 part of 2,2-azobismethylbutyronitrile (VAZO-67, DuPont) in 5 parts toluene is added and stirred 0.1 hour. A reactor equipped with a stirrer, thermocouple reaching into the charged reaction mixture, $N_2$ inlet atop an addition funnel attached to a subsurface tube, and $H_2O$ condenser is charged with about ⅓ of the monomer-initiator solution. The remainder is placed in the addition funnel. With $N_2$ addition at 0.3 SCFH and stirring, the mixture is heated to 110° C. over 0.3 hour, heating is stopped and an exotherm to 138° C. over 0.1 hours is observed. The temperature begins to drop and after 3 minutes, at 136° C. dropwise addition of the remaining solution is begun. Addition time is 2 hours; 0.4 hours after the peak exothermic temperature, the temperature is 110° C. The temperature during addition is maintained at 110° C. The materials are cooled to 90° C. over 0.3 hour followed by addition of 0.2 part t-butyl peroctoate (Trigonox 21, AKZO) followed by dropwise addition of 3.9 parts NVI over 1 hour at 90° C. The reaction is held at 90° C. for 1 hour. While maintaining 90° C., two additional increments of Trigonox 21, each of 0.1 part, are added, the second addition 2 hours after the first. The mixture is held at 90° C. for 1 hour. An additional 90.4 parts Hydrocal 38 oil is added, the materials are heated to 150° C. and stripped at 30–50 millimeters mercury for 1 hour, collecting 6 parts distillate. The residue is filtered employing a diatomaceous earth filter aid at 110° C. The resulting product has $M_n$=71,600 and polydispersity= 2.61.

EXAMPLE 6

A monomer-initiator solution is prepared as described in Example 1 except the oil is a 40 neutral naphthenic oil (Cross L-40, Cross Oil Co., Smackover Ark., USA) and reacted substantially as described in Example 1; maximum exotherm=138° C. After cooling to 90° C. 0.25 part Trigonox 21 is added, stirred for 0.1 hour followed by dropwise addition of 7 parts NVI over 1 hour at 90° C. and heating for 1 additional hour. Trigonox 21 (0.13 part) is added, the materials are heated at 90° C. for 2 hours then additional 0.13 part Trigonox 21 is added. The reaction is continued for 1 hour, 80 parts Cross L-40 oil are added and the materials are stripped to 150° C. at 50 mm Hg for 1 hour removing 2 parts distillate. The materials are filtered yielding a filtrate containing a polymer having $M_n$=55,000 and polydispersity=2.72.

EXAMPLE 7

The procedure of Example 6 is repeated except the oil is a hydrotreated naphthenic oil (Hydrocal 41, Calumet Lubricants). The product has $M_n$=52,500 and polydispersity 2.73.

EXAMPLE 8

Following essentially the procedure of Example 1, a solution is prepared by mixing 27.5 parts methyl methacrylate, 5.5 parts butyl methacrylate, 105.5 part $C_9$-$C_{11}$ methacrylate, 105.5 parts $C_{12}$-$C_{15}$ methacrylate, 52.5 parts $C_{16}$-$C_{18}$ methacrylate and 80 parts $C_{12-16}$ alkylated aromatics (Huntsman Specialty Chemicals, Chocolate Bayou, Tex., USA), then mixing in a solution of 2.3 parts VAZO-67 in 10 parts toluene. A reactor is charged with about ⅓ of this mixture and the remainder is added to an addition funnel. With stirring and $N_2$ addition at 0.3 SCFH the mixture is heated to 110° C. over 0.3 hours, heating is discontinued and the temperature rises exothermically to 136° C. over 2 minutes. After 2 minutes the temperature begins to drop; at 134° C. dropwise addition of the remaining monomer-initiator mixture is begun. The temperature is at 110° C. 0.3 hours after the peak exotherm. The balance of the mixture is added over 2 hours at 110° C. The materials are cooled to 90° C. and 0.2 part Trigonox 21 is added all at once. To this mixture are added 3.5 parts NVI at a dropwise rate over 1 hour, the materials are heated at 90° C. for 1 hour followed by addition of 0.1 part Trigonox 21. The materials are heated at 90° C. for 2 hours followed by addition of 0.2 parts Trigonox 21 followed by stirring at 90° C. for an additional 1.2 hours. To this mixture are added 120 parts $C_{12-16}$ alkylated aromatics, the materials are heated with stirring to 150° C. and stripped to 15 millimeters Hg for 1 hour while 24 parts distillate are collected. The residue is filtered using a diatomaceous earth filter aid. The filtrate contains a polymer having $M_n$=36,200 and polydispersity=2.62 by GPC.

EXAMPLE 9

A methacrylate ester-oil solution as described in Example 1 is prepared followed by addition of 1.56 parts VAZO-67 in 3.1 parts toluene. Polymerization of the methacrylate monomers is conducted substantially as described in Example 1; peak exotherm=135° C. After cooling to 90° C., 0.25 part Trigonox 21 and 1.75 part NVI are added followed by addition, at 0.25 hour intervals, of 3 additional increments of 1.75 parts NVI for a total of 7 parts. The reaction is continued for 1.25 hours, 0.13 part Trigonox 21 is added, reaction is continued for an additional 2 hours then 0.13 part Trigonox 21 is added and heating is continued for 1 hour all heating at 90° C. The materials are cooled, 80 parts Risella G-07 oil are added and the materials are stripped to 150° C. at 30–50 mm Hg for 1 hour collecting 1 part distillate followed by filtration through a diatomaceous earth filter aid at 110° C. The filtrate contains a polymer having $M_n$=53,000 and polydispersity=2.77.

EXAMPLE 10

A container is charged with 33.9 parts methyl methacrylate, 7.5 parts butyl methacrylate, 133.6 parts $C_9$-$C_{11}$ methacrylate, 133.6 parts $C_{12}$-$C_{15}$ methacrylate, 67.7 parts $C_{16}$-$C_{18}$ methacrylate, 13.65 parts N-vinyl pyrrolidinone and 130 parts Risella G 07 oil. The materials are stirred for 0.25 hour, then a solution of 1.56 part VAZO-67 in 3.1 parts toluene is added followed by stirring for 0.1 hour. A reactor equipped as described in Example 1 is charged with about ⅓ of this solution; the remainder is placed in the addition funnel. With stirring and $N_2$ addition at 0.3 SCFH, the mixture is heated to 110° C. over 0.3 hour, heating is stopped and the temperature rises exothermically to 138° C. over 3 minutes. The temperature then begins to drop and after 2 minutes is at 136° C. Dropwise addition of the remaining monomer-initiator mixture is begun and is continued for 2 hours. Temperature decreases to 110° C. after 0.3 hours and is held at 110° C. during addition. After addition is completed, the mixture is cooled to 90° C. over 0.3 hour followed by charging 0.25 part Trigonox 21. The materials are stirred at 90° C. for 2 hours, 0.26 part Trigonox 21 is charged and the materials are heated for an additional 2 hours. The materials are diluted with 80 parts additional Risella G 07 oil, heated with stirring to 150° C., and stripped at 150° C., 40–50 mm Hg pressure for 1 hour, collecting 1 part distillate. The residue is filtered at 110° C. with a diatomaceous earth filter aid. The filtrate contains a polymer having $M_n$=68,000 and $M_w/M_n$=2.91.

EXAMPLE 11

The procedure of Example 10 is repeated employing 34.3 parts methyl methacrylate, 7.6 parts butyl methacrylate, 137 parts $C_{9-11}$ methacrylate, 135.3 parts $C_{16-18}$ methacrylate and replacing NVI with 8.73 parts N-vinyl formamide (NVF), other components remaining the same. The polymer product has $M_n$=58,500 and $M_w/M_n$=2.80.

EXAMPLE 12

The procedure of Example 11 is repeated employing 34 parts methyl methacrylate, 7.5 parts butyl methacrylate, 133.9 parts each of $C_{9-11}$ and $C_{12-15}$ methacrylates, 67.9 parts $C_{16-18}$ methacrylate and replacing NVF with 12.9 parts 4-vinyl pyridine, other components remaining essentially the same. The polymer product has $M_n$=56,500 and $M_w/M_n$=2.64.

EXAMPLE 13

The procedure of Example 11 is substantially followed replacing NVF with 17.3 parts N-vinyl caprolactam. The product has $M_n$=72,800 and $M_w/M_n$=3.06.

EXAMPLE 14

The procedure of Example 11 is substantially followed replacing NVF with 20.9 parts N,N-dimethylaminopropyl methacrylamide. The product has $M_n$=45,400 and $M_w/M_n$=2.64.

EXAMPLE 15

The procedure of Example 14 is followed employing 10.5 parts N,N-dimethylaminopropyl methacrylamide. The product has $M_n$=45,200 and $M_w/M_n$=2.66.

EXAMPLES 16–21

Procedures similar to that of Example 11 are conducted replacing NVF with the indicated monomers:

| Example | Monomer | $M_n$ | $M_w/M_n$ |
| --- | --- | --- | --- |
| 16 | acrylamide | 79,300 | 3.04 |
| 17 | t-octyl acrylamide | 59,900 | 2.77 |
| 18 | t-butyl acrylamide | 53,100 | 2.85 |
| 19 | methoxypropyl methacrylamide | 57,800 | 2.8 |
| 20 | 2-(N,N-dimethylamino)ethyl methacrylate | 62,300 | 2.86 |

EXAMPLE 21

The procedure of Example 2 is repeated replacing hydrotreated naphthenic oil with 150 neutral mineral oil. The polymer has $M_n$=56,800 and $M_w/M_n$=2.57.

EXAMPLE 22

The procedure of Example 2 is repeated replacing hydrotreated naphthenic oil with 85 neutral paraffinic oil (Total France). Polymer has $M_n$=64,200 and $M_w/M_n$=2.61.

EXAMPLE 23

A container is charged with 57.5 parts of methyl methacrylate, 12.7 parts butyl methacrylate, 226.5 parts each of $C_{9-11}$ methacrylate and $C_{12-15}$ methacrylate, 114.8 parts $C_{16-18}$ methacrylate, 11.7 parts NVI and 216.6 parts 85N paraffinic oil. The materials are stirred for 0.2 hours followed by addition of 2.27 parts 2,2'-azobis(2-methylbutyronitrile) (VAZO-67, DuPont) in 5 parts toluene, and mixing 0.1 hour. One third of this mixture is charged to a reactor equipped with a stirrer, condenser, $N_2$ inlet atop an addition funnel and thermocouple in solution; the remainder is charged to the addition funnel. With stirring and $N_2$ sparge at 0.3 SCFH the reactor contents are heated to 110° C. over 0.5 hours, then heating is stopped. The temperature rises exothermically to 133° C. over 0.05 hours. The temperature begins to drop and after 2 minutes reaches 132° C. at which time addition of the solution from the addition funnel is begun. During addition (2 hours) the temperature drops to 110° C. and is then maintained at 110° C. The reaction mixture is cooled to 90° C. over 0.3 hours then 0.43 parts Trigonox 21 is charged, the materials are held 90° C. for 2 hours, then 0.43 parts additional Trigonox 21 is charged and the materials are held at 90° C. for 2 more hours. Additional 85N paraffinic oil is added (133.4 parts), the solution is heated to 150° C. then strip to 60 mm Hg over 1 hour; 3 parts distillate collected. Product is filtered at 120° C. with a diatomaceous earth filter aid. $M_n$ (PMA standard) 53,800, $M_w/M_n=2.6$.

The data in the following table illustrate the effect of the products of this invention with respect to improving viscosity characteristics of a typical oil of lubricating viscosity. Each oil blend contains 5% or 10% by weight of the indicated product (no adjustment is made for diluent content) of the additive in a solvent refined 100 neutral mineral oil. Viscosities are determined employing the procedure set out in ASTM Standard D-445 and the viscosity index is determined employing the procedure set out in ASTM Standard D-2270, both of which appear in the Annual Book of ASTM Standards, Section 5, Petroleum Products. Lubricants and Fossil Fuels, ASTM, 1916 Race Street, Philadelphia, Pa., USA. ASTM Procedure D-445 covers, in general, the determination of kinematic viscosity of liquid petroleum products by measuring the time for a volume of liquid to flow under gravity through a calibrated glass capillary viscometer. ASTM Procedure D-2270 provides a means for calculating Viscosity index. Viscosities in the following table are given in centistokes.

Additive Effect—Viscosity and Viscosity Index

| Product of Ex- | @ 5% Treatment | | | @ 10% Treatment | | |
|---|---|---|---|---|---|---|
| | Viscosity | | Viscosity | Viscosity | | Viscosity |
| ample | 40° C. | 100° C. | Index | 40° C. | 100° C. | Index |
| None | 20 | 4.09 | 100 | | | |
| 1 | 30.4 | 6.5 | 176 | — | — | — |
| 3 | 30.5 | 6.6 | 183 | — | — | — |
| 4 | 28.8 | 5.9 | 158 | 40.8 | 8.4 | 185 |
| 5 | 33.9 | 7.3 | 189 | 45.4 | 10.2 | 221 |
| 6 | 31.6 | 6.8 | 180 | 47.5 | 10.3 | 213 |
| 7 | 32.0 | 6.9 | 186 | 46.6 | 10.1 | 212 |
| 8 | 28.7 | 6.0 | 164 | 40.5 | 8.6 | 199 |
| 9 | 34.0 | 7.3 | 189 | 54.8 | 12.0 | 189 |
| 10 | 32.3 | 7.0 | 189 | 48.4 | 10.8 | 222 |
| 11 | 28.5 | 6.4 | 186 | 41.8 | 9.6 | 224 |
| 13 | 30.6 | 6.6 | 178 | 47.5 | 10.4 | 216 |
| 14 | 29.5 | 6.5 | 180 | 41.2 | 9.2 | 215 |
| 15 | 30.4 | 6.5 | 178 | 44.9 | 9.8 | 213 |
| 16 | 28.8 | 6.3 | 181 | 42.6 | 9.6 | 217 |
| 17 | 31.7 | 6.7 | 174 | 47.5 | 10.0 | 205 |
| 18 | 31.2 | 6.6 | 173 | 46.5 | 9.9 | 206 |
| 19 | 28.7 | 6.3 | 181 | — | — | — |
| 20 | 33.3 | 7.1 | 185 | — | — | — |
| 21 | 33.3 | 7.0 | 181 | 50.0 | 10.4 | 204 |

Low Temperature Characteristics

As mentioned hereinabove, low temperature characteristics of lubricating compositions comprising additive concentrates of this invention which contain certain selected diluents are unexpectedly improved. This benefit is illustrated by the data in the following table.

Each blend contains 5% by weight of the product of the indicated Example (without adjusting for diluent content) in a partial synthetic lubricating oil containing 80% by weight of mineral oil (90N, Esso Stanco) and 20% by weight of a polyalphaolefin oil having a viscosity at 100° C. of 4 centistokes (Emery 3004). Viscosities at 40° C. and 100° C. are given in centistokes; Brookfield viscosities are in centipoise.

| Product of | Viscosity | | | Brookfield |
|---|---|---|---|---|
| Example | 40° C. | 100° C. | Viscosity Index | Viscosity (−40° C.) |
| None | 18.0 | 3.9 | 111 | Solid |
| 21 | 29.0 | 6.5 | 190 | 9250 |
| (repeat) | 29.4 | 6.6 | 192 | 12000 |
| 2 | 29.3 | 6.7 | 199 | 8450 |
| (repeat) | 29.5 | 6.8 | 200 | 10800 |
| 22 | 31.1 | 7.1 | 203 | 11400 |

Note:
Repeat trials were conducted on freshly prepared blends; trials on blend containing product of Example 22 were conducted at the same time as repeat trials.

As is apparent, the polymers of these Examples are desirable viscosity index improvers. Another significant benefit is that the products of the instant invention improve both high temperature and low temperature characteristics of base oils. The viscosity of base oil without additive is strongly affected by changes in temperature while both the low and high temperature properties of the additive treated oils are less affected. In fact, the additives of this invention have a desirable viscosity lowering effect at very low temperatures yet still reduce the loss of viscosity at high temperatures. In effect, the additives perform not only as dispersant-viscosity improvers but also provide a fluidizing effect at very low temperatures.

A particularly surprising effect is provided by the product of Example 2.

In the following Table are given viscosity characteristics of diluents used to prepare the dispersant-viscosity improvers used in the lubricating oil compositions of the preceeding Table:

| Oil | Used in Ex-ample | Viscosity 40° C. | Viscosity 100° C. | Viscosity Index | Brookfield Viscosity | |
|---|---|---|---|---|---|---|
| | | | | | −26° C. | −40° C. |
| 150N | 21 | 32.05 | 5.33 | 98 | Channel | Solid |
| Risella G-07 | 2 | 2.91 | 1.18 | — | 90 | 150 |
| 85N | 22 | 15.56 | 3.50 | 102 | 60,000 | Solid |

Noteworthy is the fact that the hydrotreated naphthenic oil has a viscosity index so low as to be virtually unmeasurable. Yet, when the viscosity improver of Example 2 is used in a lubricating oil composition, surprisingly the viscosity index of the resulting formulation is at least comparable to those incorporating dispersant viscosity improvers of Examples 21 and 22 which contain diluents having relatively high viscosity indices.

Also surprising is that while the dispersant viscosity improvers of Examples 2 and 22 contain oils having relatively low kinematic viscosity, and provide good low temperature properties to a lubricating oil composition, there is no adverse effect on 40° C. and 100° C. viscosities.

The Oil of Lubricating Viscosity

The lubricating compositions and methods of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl, (e.g., biphenyls, terphenyls, alkylated polyphenyls, etc.), alkylated diphenyl ethers and alkylated diphenyl sulfides and the derivatives, analogs and homologues thereof and the like.

Alkylene oxide polymers and interpolymers and derivatives thereof where their terminal hydroxyl groups have been modified by esterification, etherification, etc., constitute another useful class of known synthetic lubricating oils.

Another suitable class of synthetic lubricating oils that can be used comprises the esters of di- and polycarboxylic acids and those made from $C_5$ to $C_{20}$ monocarboxylic acids and polyols and polyethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Rerefin oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin, Ill., U.S. Pat. No. 4,326,972, European Patent Publication 107,282, and A. Sequeria Jr., Lubricant Base Oil and Wax Processing, Chapter 6, Marcel Decker, Inc., New York (1994), each of which is hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

Other Additives

As mentioned, lubricating oil compositions of this invention may contain other components. The use of such additives is optional and the presence thereof in the compositions of this invention will depend on the particular use and level of performance required. Thus the other additive may be included or excluded. The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, oxidation inhibiting agents, pour point depressing agents, extreme pressure agents, anti-wear agents, color stabilizers and anti-foam agents. The above-mentioned dispersants and viscosity improvers may be used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or anti-oxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publisher, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by a least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a nonvolatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. patents including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecular weight aliphatic or alicyclic halides with amines, preferably polyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. patents are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitrites, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Polymers and copolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight, usually ranging from about 0.01% to about 20% by weight. In most instances, they each contribute from about 0.1% to about 10% by weight, more often up to about 5% by weight.

The various additives described herein can be added directly to the lubricant. Preferably, however, they are diluted with a substantially inert, normally liquid organic diluent such as mineral oil, naphtha, benzene, toluene or xylene, to form an additive concentrate. Preferred additive concentrates usually comprise about 0.1 to about 80% by weight of the compositions of this invention and may contain, in addition, one or more other additives known in the art or described hereinabove. Concentrations such as 15%, 20%, 30% or 50% or higher may be employed.

The lubricating compositions of this invention are illustrated by the examples in the following Tables. The lubricating compositions are prepared by combining the specified ingredients, individually or from concentrates, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. These examples are presented for illustrative purposes only, and are not intended to limit the scope of this invention.

EXAMPLES I–VI

Lubricating oil compositions are prepared by blending into a mineral oil basestock 1.41% of the reaction product of a polyisobutenyl ($M_n \cong 1700$) substituted succinic anhydride and ethylene polyamine, 0.47% of sulfurized Diels-Alder adduct of butadiene and butyl acrylate, 0.81% of a zinc salt of mixed primary dialkyl dithiophosphoric acids, 0.78% of calcium overbased (metal ratio 12) alkyl benzene sulfonic acid and 3.3% of the listed products of this invention:

| Example | Product of Example |
|---|---|
| I | 3 |
| II | 9 |
| III | 10 |
| IV | 11 |
| V | 12 |
| VI | 16 |

EXAMPLES VII–X

Lubricating oil compositions similar to those of the preceeding examples are prepared in a mineral oil basestock, adding thereto 1.41% of the reaction product of a polyisobutenyl ($M_n \cong 1700$) substituted succinic anhydride and ethylene polyamine, 0.61% of sulfurized Diels-Alder adduct of butadiene and butyl acrylate, 1.05% of a zinc salt of mixed primary dialkyl dithiophosphoric acids, 1.0% of calcium overbased (metal ratio 12) alkyl benzene sulfonic acid and 3.3% of the listed products of this invention:

| Example | Product of Example |
|---------|--------------------|
| VII     | 13                 |
| VIII    | 14                 |
| IX      | 15                 |
| X       | 17                 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. An additive concentrate comprising a nitrogen-containing copolymer units derived from
   (A) from about 30% to about 60% by weight of alkyl acrylate ester monomers containing from 1 to 11 carbon atoms in the alkyl group;
   (B) from about 40% to about 70% by weight of alkylacrylate ester monomers containing from 12 to about 24 carbon atoms in the alkyl group; and
   (C) from about 0.5% to about 5% by weight of at least one nitrogen containing monomer selected from the group consisting of vinyl substituted nitrogen heterocyclic monomers, N,N-dialkylaminoalkyl acrylate monomers, N,N-dialkylaminoalkyl acrylamide monomers and tertiary-alkyl acrylamides, provided that the total equals 100%.

2. The additive concentrate of claim 1 wherein monomer (A) comprises at least 5% by weight of alkyl acrylate esters having from 4 to 11 carbon atoms in the alkyl group.

3. The additive concentrate of claim 1 wherein monomer (A) comprises from about 10% to about 40% by weight of alkyl acrylate esters having from 1 to 4 carbon atoms in the alkyl group.

4. The additive concentrate of claim 1 wherein monomer (A) comprises from about 60% to about 90% by weight of alkyl acrylate esters having from 9 to 11 carbon atoms in the alkyl group.

5. The additive concentrate of claim 1 wherein the nitrogen containing monomer is an N-vinyl substituted heterocyclic monomer.

6. The additive concentrate of claim 5 wherein the N-vinyl substituted heterocyclic monomer is at least one member of the group consisting of N-vinyl imidazole, N-vinyl pyrrolidinone and N-vinyl caprolactam.

7. The additive concentrate of claim 1 wherein the vinyl substituted heterocyclic monomer is a vinyl pyridine.

8. The additive concentrate of claim 7 wherein the nitrogen containing monomer is a N,N-dialkylaminoalkyl acrylamide or acrylate wherein each alkyl or aminoalkyl group contains, independently, from 1 to about 8 carbon atoms.

9. The additive concentrate of claim 1 wherein the nitrogen containing monomer is tertiary butyl acrylamide.

10. The additive concentrate of claim 1 wherein (C) the nitrogen containing monomer is grafted onto an alkyl acrylate copolymer containing units derived from
    (A) from about 30% to about 60% by weight of alkyl acrylate ester monomers containing from 1 to 11 carbon atoms in the alkyl group and
    (B) from about 40% to about 70% by weight of alkyl acrylate ester monomers containing from 12 to about 24 carbon atoms in the alkyl group.

11. The additive concentrate of claim 1 wherein (C) the nitrogen containing monomer is incorporated as a comonomer in an alkyl acrylate polymer.

12. The additive concentrate of claim 10 wherein monomer (A) comprises at least 5% by weight of alkyl acrylate esters containing from 4 to carbon atoms in the alkyl group.

13. The additive concentrate of claim 1 wherein the copolymer has a number average molecular weight ranging from about 10,000 to about 300,000.

14. The additive concentrate of claim 13 wherein the number average molecular weight of the copolymer ranges from about 30,000 to about 100,000.

15. The additive concentrate of claim 13 wherein the copolymer has polydispersity values ranging from about 1.5 to about 5.

16. The additive concentrate of claim 1 wherein the alkyl acrylate ester monomers comprise alkyl methacrylate esters.

17. A lubricating oil composition comprising a major amount of an oil of lubricating viscosity and a minor amount of a nitrogen-containing copolymer comprising units derived from
    (A) from about 30% to about 60% by weight of alkyl acrylate ester monomers containing from 1 to 11 carbon atoms in the alkyl group;
    (B) from about 40% to about 70% by weight of alkyl acrylate ester monomers containing from 12 to about 24 carbon atoms in the alkyl group; and
    (C) from about 0.5% to about 5% by weight of at least one nitrogen containing monomer selected from the group consisting of vinyl substituted nitrogen heterocyclic monomers, N,N-dialkylarninoalkyl acrylate monomers, N,N-dialkylarninoalkyl acrylamide monomers and tertiary-alkyl acrylarnides, provided that the total equals 100%.

18. The lubricating oil composition of claim 17 wherein the nitrogen containing monomer (C) is grafted onto a polyacylate copolymer derived from monomers (A) and (B).

19. The additive concentrate of claim 1 wherein the diluent displays Brookfield viscosities measured by procedure ASTM D-2983 ranging from about 50 to about 400 centipoise at −26° C. and from about 100 to about 1500 centipoise at −40° C.

20. The additive concentrate of claim 1 wherein the diluent is a mineral oil.

21. The additive concentrate of claim 20 wherein the mineral oil consists essentially of hydrotreated naphthenic oil.

22. The additive concentrate of claim 1 wherein the diluent is a synthetic oil.

23. The additive concentrate of claim 22 wherein the synthetic oil is an ester, a polyalphaolefin oligomer or an alkylated benzene.

24. The additive concentrate of claim 1 comprising from about 25% to about 90% by weight of copolymer and from about 10% to about 75% by weight of diluent.

25. The additive concentrate of claim 24 comprising from about 35% to about 80% by weight of copolymer and from about 20% to about 65% by weight of diluent.

26. The lubricating oil composition of claim 17 wherein the oil of lubricating viscosity comprises a mixture of mineral oil and synthetic oils.

* * * * *